United States Patent [19]

Detriche et al.

[11] Patent Number: 5,233,526
[45] Date of Patent: Aug. 3, 1993

[54] PROCESS FOR RELOCKING ON A THEORETICAL TRAJECTORY FOR A VEHICLE, WHILST MODIFYING THE CURVATURE OF THE REAL TRAJECTORY

[75] Inventors: Jean-Marie Detriche, Noisy le Roi; Alain Micaelli, Fontenay Aux Roses, both of France

[73] Assignee: Commissariat a l'Energie Atomique, Paris, France

[21] Appl. No.: 626,946

[22] Filed: Dec. 13, 1990

[30] Foreign Application Priority Data

Dec. 22, 1989 [FR] France ................. 89 17105

[51] Int. Cl.⁵ .............................................. G01S 1/00
[52] U.S. Cl. ............................. 364/424.02; 180/167; 364/444
[58] Field of Search ................ 364/424.02, 424.01, 364/428, 430, 433, 434, 435, 444, 450; 180/167, 168, 169; 340/933, 942

[56] References Cited

U.S. PATENT DOCUMENTS

| | | | |
|---|---|---|---|
| 3,757,887 | 9/1973 | Moore | 180/98 |
| 4,817,000 | 3/1989 | Eberhardt | 364/424.02 X |
| 4,852,677 | 8/1989 | Okazaki | 180/169 |

FOREIGN PATENT DOCUMENTS

| | | |
|---|---|---|
| 0049697 | 4/1982 | European Pat. Off. |
| 0252219 | 1/1988 | European Pat. Off. |
| 0273976 | 7/1988 | European Pat. Off. |

OTHER PUBLICATIONS

Patent Abstracts of Japan, vol. 11, No. 103, Apr. 2, 1987.

*Primary Examiner*—Jack B. Harvey
*Assistant Examiner*—E. J. Pipala
*Attorney, Agent, or Firm*—Ladas & Parry

[57] ABSTRACT

A process for relocking a driverless, robotized vehicle (1) on a theoretical trajectory ($T_{th2}$) in which during the passage of the vehicle through a joining section ($S_1$), the curvature of the trajectory of the vehicle (1) is progressively modified as a function of the instantaneous curvature and the heading or course ($\theta$). Thus, there are no orientation discontinuities along the trajectory, which imposes no impossible operating conditions on the drive members of the vehicle, but still makes it possible to converge rapidly with the theoretical trajectory.

8 Claims, 2 Drawing Sheets

PROCESS FOR RELOCKING ON A THEORETICAL TRAJECTORY FOR A VEHICLE, WHILST MODIFYING THE CURVATURE OF THE REAL TRAJECTORY

FIELD OF THE INVENTION

The present invention relates to a process for relocking on a theoretical trajectory for an in particular robotized vehicle and which consists of modifying the curvature of the real trajectory.

BACKGROUND AND PRIOR ART

Several processes are already known aiming at bringing a vehicle onto a reference or nominal trajectory, or in other words to bring about coincidence between a trajectory actually followed by the vehicle and a theoretical trajectory.

In general terms, the theoretical trajectory is modeled by a succession of rectilinear or curved segments with a constant or non-constant radius of curvature, which join at position finding or localization points identified by beacons. French Patent 89 08049 describes a certain number of means which can serve as beacons and in particular radiophonic wave transmitters, reflecting posts or magnets buried in the ground. No matter what the localization method adopted, absolute position fixings for the vehicle, also referred to as localizations and which make it possible to deduce the variation between the real vehicle position and the localization point, are effected by appropriate sensors of the vehicle when the latter passes close to these localization points.

Once a deviation has been determined, a known relocking process consists of calculating a joining section to the theoretical trajectory leading to one of the following localization points thereof. For this purpose the coordinates of a certain number of intermediate points between which the joining section is broken down are calculated. If it is wished to avoid excessively sudden variations of the course of the vehicle and bring about a relatively rapid convergence to the theoretical trajectory, the number of intermediate points and therefore the calculation volume must be considerably increased, which may make it necessary to temporarily stop the vehicle.

Once the localization has been made and the variation with the localization point calculated, another process consists of making a vehicle follow a connection section to said localization point and not one of the following points. In certain cases, this method involves transverse displacements of the vehicle, which are sometimes impossible or only achievable with great difficulty.

SUMMARY OF THE INVENTION

The invention obviates these disadvantages and offers the possibility of relocking the vehicle on its theoretical trajectory by means of joining trajectories which can be easily traversed, which does not have to be expressly calculated and which rapidly converge with the theoretical trajectory. The only calculations necessary are much more simple and are distributed over the entire passage time of the joining trajectory.

Thus, in general terms, the process consists, when a position finding of the absolute position of the vehicle is performed to give the variation between the real vehicle position and the theoretical trajectory, of controlling successive modifications of the curvature of the real trajectory in accordance with a mathematical formula, which is a function of the instantaneous heading or course of the vehicle and the instantaneous curvature of the real trajectory in order to bend the latter towards the theoretical trajectory.

The vehicle is equipped with localization sensors used for vehicle position finding and also a course or heading sensor. This sensor is a direct measuring means or calculating means making it possible to obtain the vehicle course, e.g. by derivation of its position. The curvature of the real trajectory can be evaluated in different ways according to the design of the vehicle and the way in which it is equipped with localization sensors. In the case of a vehicle with non-orientable, independent driving wheels, it is evaluated as a function of different speeds of the right and left-hand driving wheels. The same procedure can be used with a caterpillar vehicle. However, in the case of steerable wheels, their orientation must be measured.

The successive modifications of the curvature of the trajectory can be controlled in accordance with a time or space sampling, i.e. at given distance covered or time intervals. Use is then made of displacement sensors normally present on robots, such as coding wheels rolling on the ground. Such sensors do not have an adequate accuracy to make it possible to locate the vehicle in absolute terms, but are adequate for evaluations over short distances.

The theoretical trajectory can be defined or modeled in the form of a theoretical heading, a straight line, a joining point, a circle or a circular arc or in general terms by a random curve defined in the form of a table of points. As a function of the particular case, the relocking algorithms which constitute the effective realization of the invention will differ. Certain of them will now be described with the aid of the attached drawings, wherein show:

DETAILED DESCRIPTION

Figure 1:
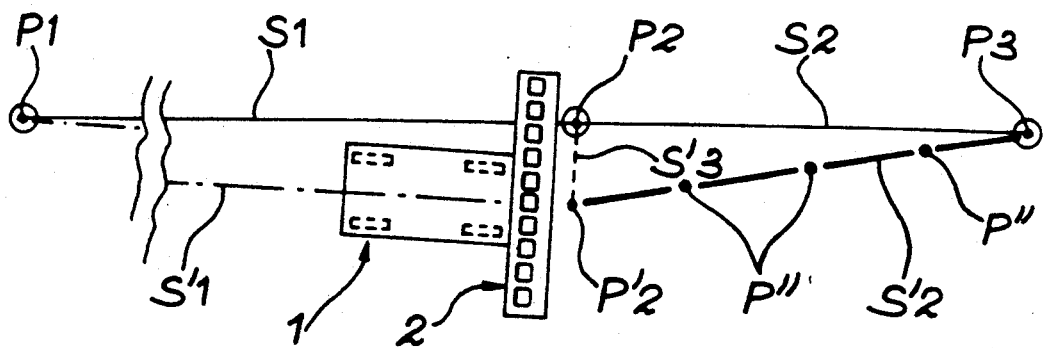
FIG. 1 the two prior art methods described hereinbefore.

FIG. 1 shows two sections $S_1$ and $S_2$ of a theoretical trajectory extending respectively between localization points $P_1$, $P_2$ and $P_2$, $P_3$. When a vehicle 1 attempts to follow said theoretical trajectory, e.g. from point $P_1$, it does so with a certain error and in fact traverses a section $S'_1$ joining point $P_1$ to point $P'_2$, which is laterally or longitudinally spaced from $P_2$. When the vehicle 1 reaches point $P'_2$, its localization sensors enable it to calculate the distance between the two points $P_2$ and $P'_2$. In the case where the point $P_2$ is defined by a buried magnetic beacon, the vehicle 1 is equipped with a lateral row 2 of magnetic sensors. Determination then takes place of the variation of the points $P_2$ and $P'_2$ by identifying the magnetic sensor, which records the most intense field, or by carrying out an interpolation as a function of fields recorded by two adjacent sensors passing on either side of the magnetic beacon.

Once the position of the point $P'_2$ has been determined, a first known method consists of determining a joining section $S'_2$ joining the points $P'_2$ and $P_3$. The vehicle 1 is oriented to follow this joining segment $S'_2$, which is of the same rectilinear or curved nature as the section $S_2$ and which is defined by a certain number of passage points P″, whose coordinates are calculated as a function of the points P′₂ and P₃.

A second known method consists of making the vehicle 1 cover a connecting section S′₃ between P′₂ and P₂ in order to make it move away again from the latter point. The connecting section S′₃ is sometime substantially at right angles to sections S′₁ and S₂ and of short length, so that it cannot be covered directly, but only as a result of complicated maneuvers of the vehicle 1. It is even possible for P′₂ to be in front of P₂, which involves a reverse movement.

Figure 2:
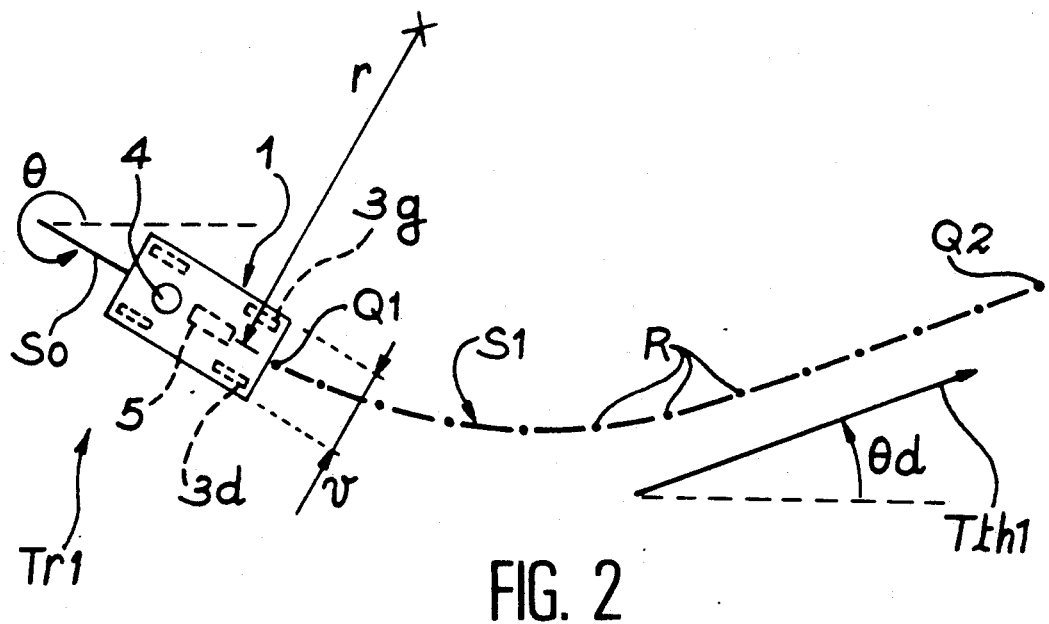
FIGS. 2 to 6 five embodiments of the invention.

FIG. 2 shows that the vehicle 1 is equipped with a left-hand driving wheel $3g$ and a right-hand driving wheel $3d$, a heading or course sensor 4 such as a compass and a relative displacement sensor 5 such as a coding wheel. The theoretical trajectory $T_{th1}$ is defined by a theoretical heading $\theta d$ with respect to a fixed angular reference shown in dotted lines. The vehicle 1 arrives at a point $Q_1$ after covering a segment $S_O$ of the real trajectory $T_{r1}$ and the course which it follows at this moment is defined with respect to the same angular reference by the angle $\theta$. A localization carried out at this point $Q_1$ here consists of a determination of the heading $\theta$.

The joining segment $S_1$ which the vehicle 1 will now follow for connecting to the theoretical trajectory $T_{th1}$, i.e. following the theoretical heading $\theta d$, is now defined by the formula (1):

$$g = -\alpha(\theta d - \theta) - \beta c.$$

in which $\alpha$ and $\beta$ are constant coefficients.

In this formula, c represents the instantaneous curvature of the real trajectory and g a curvature variation making it possible to gradually inflect or bend the real trajectory $T_{r1}$ towards the theoretical trajectory $T_{th1}$. The term "instantaneous" here means "at the considered instant" and is applied to mathematical quantities, whose value is going to vary. More precisely, if s is used to designate the curved abscissa covered on the real trajectory $T_{r1}$, c can mathematically be defined by:

$$c = \frac{d\theta}{Ds} \text{ and } g = \frac{d^2\theta}{ds^2}.$$

In practice, the curvature c can be evaluated with the aid of the control of the locomotive members of the vehicle 1. In the case of wheels 3 rolling without sliding on the ground, on calling r the instantaneous radius of curvature of the trajectory $T_{r1}$ and v the path of the vehicle 3, $\omega g$ and $\omega d$ the angular velocities of the axles of the wheels $3g$ and $3d$ which can easily be measured by tachometers, the radius of curvature r can be evaluated by the formula:

$$\frac{r - \frac{v}{2}}{r + \frac{v}{2}} = \frac{\omega g}{\omega d}$$

with the notations of FIG. 2, so that r is the inverse of c.

Therefore in this case the joining segment $S_1$ is created by carrying out at a certain number of succeeding points R on said segment $S_1$, an evaluation of the curvature c, a reading of the heading $\theta$ and a modification of the instantaneous curvature c with the aid of formula (1), whilst modifying in the considered case the velocities $\omega g$ and $\omega d$. On of the velocities can be increased and the other decreased so as to keep constant the average speed of the vehicle 1. This process is continued up to the following localization point $Q_2$, where new calculations can be undertaken if the theoretical heading has changed. Points R follow one another at equidistant intervals or passage times defined beforehand as a function of the characteristics of the vehicle 1 and the theoretical trajectory $T_{th1}$, but their position is not calculated and remains unknown. $\alpha$ and $\beta$ are constant coefficients determined by the user as a function of the kinematic capabilities of the vehicle.

Figure 3:
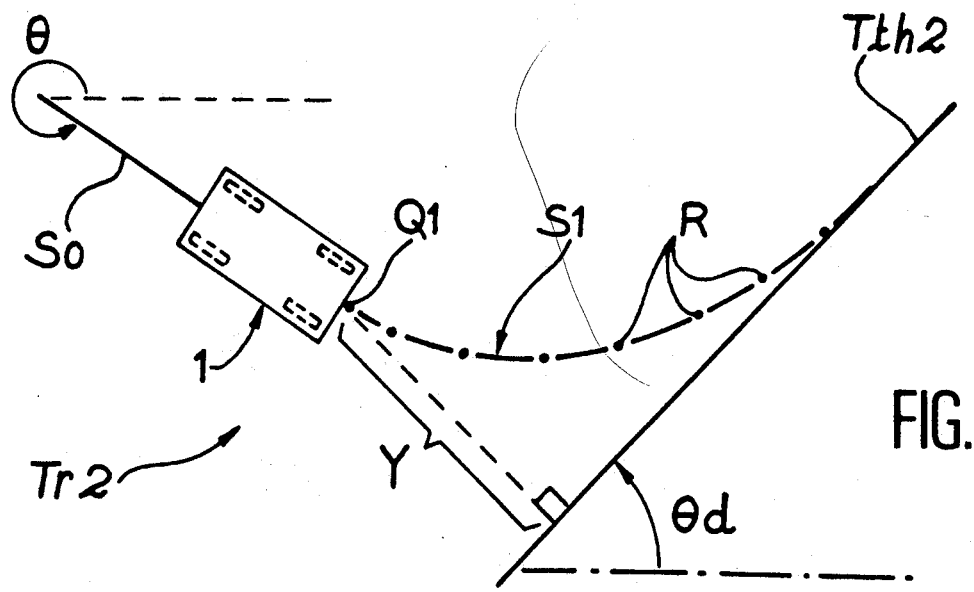

FIG. 3 represents the case where the theoretical trajectory is a straight line $T_{th2}$, which must be covered in a direction corresponding to a heading $\theta d$. The relocking process resembles the previous one with the difference that it is necessary to take account of the distance Y between the point at which the vehicle 1 is located, such as $Q_1$ and line $T_{th2}$. THe formula used is formula (2):

$$g = \frac{1}{\cos(\theta - \theta d)} \{-\alpha Y - \beta \sin(\theta - \theta d) -$$

$$\gamma c.\cos(\theta - \theta d) + c^2 \sin(\theta - \theta d)\}.$$

in which $\alpha$, $\beta$ and $\gamma$ are constant coefficients and in which Y consequently designates the instantaneous distance of the vehicle 1 on line $T_{th2}$ for each curvature change. The localization supplies the vehicle 1 with its instantaneous heading $\theta$ at the localization point $Q_1$ and the distance Y of said point from line $T_{th2}$.

A particular procedure is adopted to avoid uncertainty when $\cos(\theta - \theta d)$ is close to zero. Two cases can be distinguished as a function of Y. If Y exceeds a threshold, i.e. if the vehicle 1 is remote from line $T_{th2}$, the vehicle 1 is temporarily driven in the direction of a heading perpendicular to the line $T_{th2}$. When Y drops below the fixed threshold, the vehicle 1 is oriented in accordance with a heading parallel to the line $T_{th2}$, which bends in the direction of the vehicle 1 and makes non-zero $\cos(\theta - \theta d)$. It is then possible to return to the relocking on the line $T_{th2}$ by the formula (2). The successive distances Y can be simply evaluated by the readings of the relative heading 4 and displacement 5 sensors as a function of the previously calculated distance and the displacement of the vehicle 1 from the corresponding preceding point without it being necessary to calculate beforehand the exact position of the points R.

Figure 4:
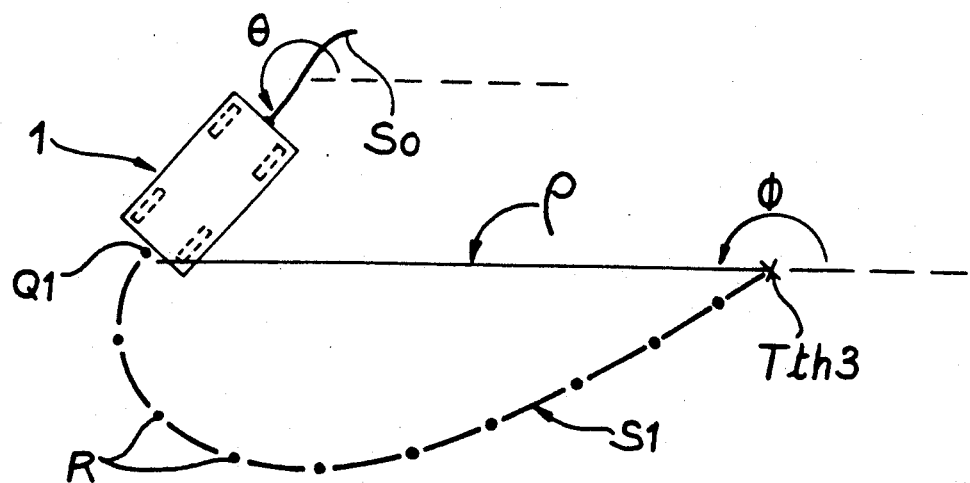

FIG. 4 also shows another case of applying the invention, where the theoretical trajectory is here a point $T_{th3}$. $\rho$ and $\phi$ designate the polar coordinates of the vehicle 1 with respect to the point $T_{th3}$ and use is made of the following formula (3) for obtaining the desired convergence of the joining section $S_1$:

$$g = -\alpha(\beta - \phi + \pi) - \beta\left[c - \frac{1}{\rho}\sin(\theta - \phi)\right] +$$

$$\frac{c}{\rho}\cos(\theta - \phi) - \frac{1}{\rho^2}\sin 2(\theta - \phi)$$

in which $\alpha$ and $\beta$ are constant coefficients. As represented, the application of this formula (3) firstly makes it possible to orient the vehicle 1 towards the point $T_3$ and then to approach it along a substantially rectilinear path. The coordinates $\rho$ and $\phi$ of the point $Q_1$ are supplied by the localization and those of the points R calculated with the aid of the readings of the heading 4 and displacement 5 sensors, as in the previous case.

Figure 5:
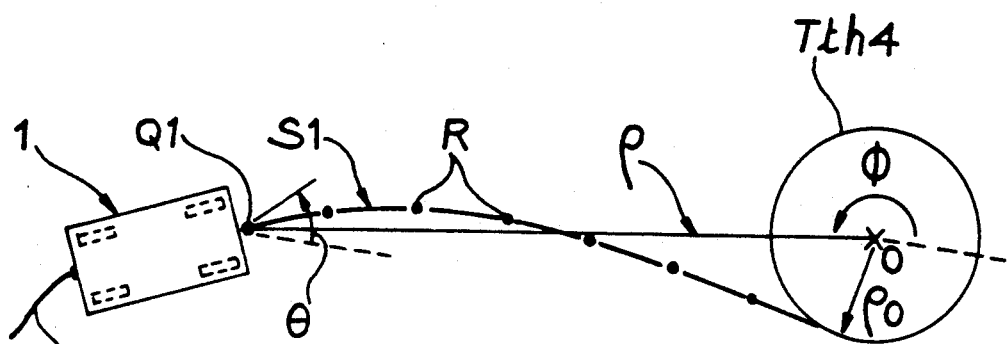

FIG. 5 shows another possible case in which the theoretical trajectory $T_{th4}$ is a circle of a center O and a radius $\rho_O$. As hereinbefore, $\rho$ and $\phi$ designate the polar coordinates of the vehicle 1 with respect to the centre O. Use is made of the formula (4), in which $\alpha$, $\beta$ and $\gamma$ are constant coefficients, in order to bring the vehicle 1 onto the circle $T_{th4}$:

$$g = \frac{1}{\sin(\theta - \phi)} \left\{ \alpha(\rho - \rho_o) + \beta\cos(\theta - \phi) + \gamma\left[\frac{1}{\rho}\sin 2(\theta - \phi) - c.\sin(\theta - \phi)\right] - \cos(\theta - \phi)\left[c^2 - 3\frac{c}{\rho}\sin(\theta - \phi) + \frac{3}{\rho^2}\sin 2(\theta - \phi)\right]\right\}.$$

Here again, a peculiarity can appear when $\sin(\theta - \phi)$ is equal to zero. This corresponds to the vehicle 1 being directed towards the center O. The control on the circle $T_{th4}$ is replaced by that on point O by applying the formula (3). At the same time, the evolution of the quantity $(\rho - \rho_o)$, which corresponds to the distance of the vehicle 1 from the circle $T_{th4}$. When this value passes below a threshold, use is made of a control on a direction tangential to the circle in such a way s to inflect the joining section $S_1$. When $\sin(\theta - \phi)$ has become non-zero, there is a return to the control on the circle $T_{th4}$.

Figure 6:
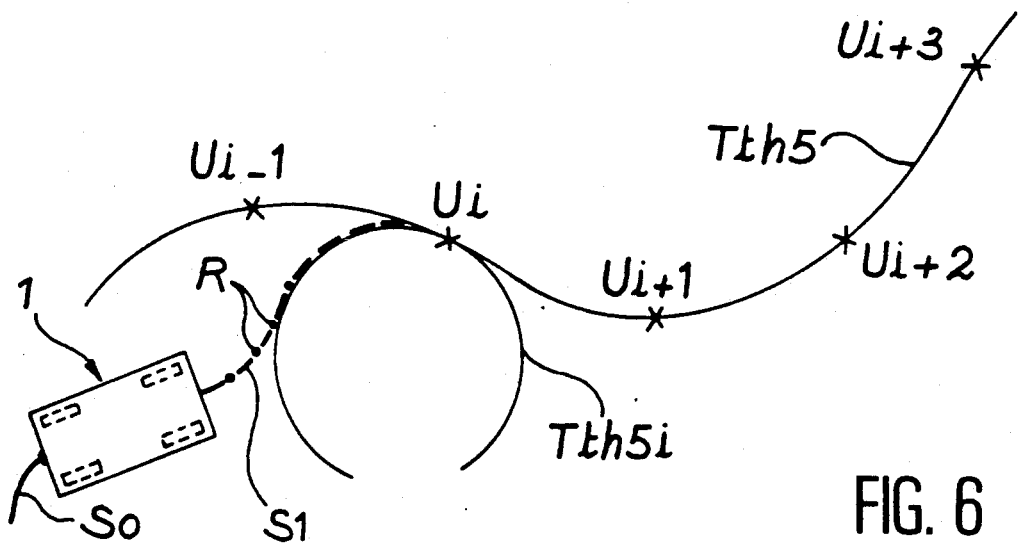

The use of the formula (4) can be generalized to theoretical trajectories $T_{th5}$ of random form, e.g. defined by the coordinates of certain of their points U recorded in the vehicle in table form. FIG. 6 shows the relocking method used in this case, which consists of bringing the vehicle 1 onto a point $U_i$ of the theoretical trajectory $T_{th5}$, the equation of the osculating circle $T_{th5i}$ to curve $T_{th5}$ at point $U_i$ is calculated, i.e. the circle tangential to the trajectory $T_{th5}$ at this point and whose radius corresponds to the radius of curvature of the trajectory $T_{th5}$ at said same point. A rapid convergence on the theoretical trajectory $T_{th5}$ is generally obtained in practice. The process is continued up to the vicinity of the objective point $U_j$, after which a calculation is made of the osculating circle to the trajectory at the following point $U_{i+1}$ and the relocking process is recommenced with this new circle.

In all cases, the invention can be performed in other ways, but the formulas given permit a rapid and reliable convergence.

We claim:

1. Process for relocking a vehicle on a theoretical trajectory, comprising the steps of:
   calculating data of constant value expressing a deviation between the theoretical trajectory and a real trajectory actually travelled by the vehicle,
   and repeatedly:
   calculating instantaneous curvature of the real trajectory and sensing instantaneous heading of the vehicle, and
   calculating a curvature modification for the real trajectory based on said data of constant value, the instantaneous curvature and the instantaneous heading,
   and advancing the vehicle to successive positions along the real trajectory during preset time intervals, and after each of said successive positions has been reached, advancing said vehicle, during the next time interval, along a trajectory corresponding to the instantaneous curvature modified by the previously calculated curvature modifications and by successive modifications of the curvature of the real trajectory, bringing the vehicle into convergence with the theoretical trajectory.

2. Process for relocking on a theoretical trajectory for a vehicle according to claim 1, in which the theoretical trajectory ($T_{th1}$) is defined by a theoretical heading ($\theta d$), comprising applying to the instantaneous curvature (c) of the real trajectory curvature modifications (g) as a function of the instantaneous heading ($\theta$) of the vehicle (1) in accordance with the formula $g = -\alpha(\theta d - \theta) - \beta c$, in which ($\alpha$) and ($\beta$) are constant coefficients.

3. Process for relocking on a theoretical trajectory for a vehicle according to claim 1, in which the theoretical trajectory is defined by a straight line ($T_{th2}$) of direction ($\theta d$), comprising applying to the instantaneous curvature (c) of the real trajectory curvature modifications (g) as a function of the instantaneous vehicle heading ($\theta$) and the instantaneous vehicle distance (Y) from the line in accordance with the formula:

$$g = \frac{1}{\cos(\theta - \theta d)} \cdot \{-\alpha Y - \beta\sin(\theta - \theta d) - \gamma c.\cos(\theta - \theta d) + c^2 \sin(\theta - \theta d)\},$$

in which ($\alpha$), ($\beta$) and ($\gamma$) are constant coefficients.

4. Process for relocking on a theoretical trajectory for a vehicle according to claim 1, in which the theoretical trajectory is defined by a point ($T_{th3}$), comprising applying to the instantaneous curvature (c) of the real trajectory curvature modifications (g) as a function of the instantaneous vehicle heading ($\theta$) and the instantaneous vehicle position relative to the point, expressed in polar coordinates ($\rho$ and $\phi$) according to the formula:

$$g = -\alpha(\theta - \phi + \pi) - \beta\left[c - \frac{1}{\rho}\sin(\theta - \phi)\right] + \frac{c}{\rho}\cos(\theta - \phi) - \frac{1}{\rho^2}\sin 2(\theta - \phi)$$

in which ($\alpha$) and ($\beta$) are constant coefficients.

5. Process for relocking on a theoretical trajectory for a vehicle according to claim 1, in which the theoretical trajectory is a circle ($T_{th4}$), comprising applying to the instantaneous curvature (c) of the real trajectory curvature modifications (g) as a function of the instantaneous vehicle heading ($\theta$), the radius ($\rho_O$) of the circle and the instantaneous position of the vehicle with respect to the center of the circle expressed in polar coordinates ($\rho$ and $\phi$) in accordance with the formula:

$$g = \frac{1}{\sin(\theta - \phi)} \bigg( \alpha(\rho - \rho_o) + \cos(\theta - \phi) +$$

-continued $$\gamma\left[\frac{1}{\rho}\sin 2(\theta - \phi) - c.\sin(\theta - \phi)\right] -$$

$$\cos(\theta - \phi)\left[c^2 - 3\frac{c}{\rho}\sin(\theta - \phi) + \frac{3}{\rho^2}\sin 2(\theta - \phi)\right]\Big\}.$$

in which ($\alpha$, $\beta$ and $\gamma$) are constant coefficients.

6. Process for relocking on a theoretical trajectory for a vehicle according to claim 5, wherein the circle ($T_{th5i}$) is obtained as a result of a preliminary modeling stage of another theoretical trajectory ($T_{th5}$), carried out after the calculation of the data of constant value and before the curvature modifications, said circle being an osculating circle at said theoretical trajectory.

7. Process for relocking on a theoretical trajectory for a vehicle according to claim 1, wherein said calculating of the data of constant value is effected by determining the variations in the real position of the vehicle and said theoretical trajectory.

8. Process for relocking on a theoretical trajectory for a vehicle as claimed in claim 7, wherein the variations in the real position of the vehicle and the theoretical trajectory is effected by measuring signals received on the vehicle in response to a beacon disposed on the theoretical trajectory.

* * * * *